United States Patent
O'Shea (10) Patent No.: US 11,221,083 B2
(45) Date of Patent: Jan. 11, 2022

(54) SURGE RELIEF VALVE

(71) Applicant: DeZURIK, Inc., Sartell, MN (US)

(72) Inventor: Timothy M. O'Shea, Palatine, IL (US)

(73) Assignee: DeZURIK, Inc., Sartell, MN (US)

( * ) Notice: Subject to any disclaimer, the term of this patent is extended or adjusted under 35 U.S.C. 154(b) by 0 days.

(21) Appl. No.: 15/990,100

(22) Filed: May 25, 2018

(65) Prior Publication Data

US 2019/0032804 A1 Jan. 31, 2019

Related U.S. Application Data

(60) Provisional application No. 62/538,475, filed on Jul. 28, 2017.

(51) Int. Cl.
| | |
|---|---|
| *F16K 17/10* | (2006.01) |
| *F16K 17/04* | (2006.01) |
| *F02M 11/04* | (2006.01) |
| *F16K 17/02* | (2006.01) |
| *F02M 61/20* | (2006.01) |
| *F01B 11/00* | (2006.01) |

(52) U.S. Cl.
CPC .......... *F16K 17/10* (2013.01); *F16K 17/0433* (2013.01); *F01B 11/003* (2013.01); *F02M 11/04* (2013.01); *F02M 61/20* (2013.01); *F02M 61/205* (2013.01); *F16K 17/02* (2013.01)

(58) Field of Classification Search
CPC ...... F16K 17/10; F16K 17/0433; F16K 17/02; F01B 11/003; F01L 2109/00; F02M 11/04; F02M 61/20; F02M 61/205

USPC .......... 137/488, 505.27, 505.32, 514, 514.5; 251/63.6, 282

See application file for complete search history.

(56) References Cited

U.S. PATENT DOCUMENTS

| | | | | |
|---|---|---|---|---|
| 740,495 | A * | 10/1903 | Waring | F16K 17/10 |
| | | | | 137/488 |
| 2,274,663 | A * | 3/1942 | Brisbane | F16K 17/10 |
| | | | | 137/488 |
| 2,834,374 | A * | 5/1958 | Klinkenberg | F16K 17/0433 |
| | | | | 137/541 |
| 2,927,604 | A * | 3/1960 | Johnson | F16K 15/063 |
| | | | | 137/514.5 |
| 2,927,605 | A * | 3/1960 | Stephens | F16K 15/063 |
| | | | | 137/514.5 |
| 3,108,777 | A * | 10/1963 | Ray | F16K 31/0689 |
| | | | | 251/54 |
| 3,529,624 | A * | 9/1970 | Cryder | F16K 17/10 |
| | | | | 137/509 |
| 3,618,690 | A * | 11/1971 | Johnson | F16K 17/042 |
| | | | | 137/514.7 |

(Continued)

*Primary Examiner* — Minh Q Le
(74) *Attorney, Agent, or Firm* — Pauly, DeVries Smith & Deffner LLC (57) ABSTRACT

A surge relief angle valve (SRA) is disclosed. The surge relief angle valve is held normally-closed by one or more compression spring(s). In certain embodiments the surge relief angle valve includes a body containing a disc and disc seat; a piston and shaft, the piston and shaft in communication with the disc and disc seat; and a spring providing a force against the piston; wherein the spring is enclosed within a housing and wherein the surge relief valve has a closed self-contained hydraulic system containing the piston and shaft, and providing a dampening force against the spring force.

16 Claims, 7 Drawing Sheets

(56) References Cited

U.S. PATENT DOCUMENTS

| | | | | |
|---|---|---|---|---|
| 4,270,569 A * | 6/1981 | Reay | E21B 21/10 | 137/514.7 |
| 4,401,264 A * | 8/1983 | Williams | F16K 17/0433 | 137/509 |
| 4,485,843 A * | 12/1984 | Wolff | F16K 17/04 | 137/514 |
| 4,595,033 A * | 6/1986 | Walsh, Jr. | F16K 17/08 | 137/529 |
| 4,936,424 A * | 6/1990 | Costa | F16F 9/064 | 188/314 |
| 5,234,023 A * | 8/1993 | Lai | F16K 17/065 | 137/478 |
| 5,603,348 A * | 2/1997 | Geringer | F16K 17/0433 | 137/454.5 |
| 5,685,333 A * | 11/1997 | Skaryd | F16K 15/063 | 137/514 |
| 6,102,667 A * | 8/2000 | Johnson | B60S 5/046 | 417/12 |
| 6,293,514 B1 * | 9/2001 | Pechoux | F16K 1/52 | 137/625.3 |
| 6,443,182 B1 * | 9/2002 | Hathcock | F16K 15/063 | 137/514.5 |
| 7,690,587 B2 * | 4/2010 | Cooke | F02M 51/0603 | 239/102.2 |
| 9,556,925 B2 * | 1/2017 | Marking | F16F 9/466 | |
| 2004/0250626 A1 * | 12/2004 | Comstock | G01L 23/00 | 73/706 |
| 2008/0125624 A1 * | 5/2008 | Hatori | A61B 1/00057 | 600/103 |
| 2008/0167614 A1 * | 7/2008 | Tolkowsky | A61M 16/04 | 604/131 |
| 2009/0108106 A1 * | 4/2009 | Ciampolini | F02M 51/0671 | 239/533.12 |
| 2019/0003864 A1 * | 1/2019 | Kristol | F16K 31/566 | |

* cited by examiner

SURGE RELIEF VALVE

FIELD OF THE INVENTION

The present application is directed to valves, in particular to surge relief valves for use in pipelines and similar media handling systems.

BACKGROUND

Pipelines, and similar media handling and conveying systems, often undergo sudden and significant changes in pressure. These changes in pressure can occur, for example, when a valve is opened or closed, especially when a valve is suddenly opened or closed. Spring loaded surge relief valves are sometimes utilized on fluids that contain solids (raw water and sewage) where other valves are not viable. Such spring-loaded surge relief valves are often sold along with check valves on pump station projects.

SUMMARY

The present disclosure is directed to surge relief valves and components for surge relief valves. The surge relief valves can be constructed to decrease valve height to fit more vaults and pump stations relative to existing valve constructions. A self-contained hydraulic system is used instead of an external oil reservoir for oil-dampening during closure. Thus, the surge relief valves provide a direct response to pressure upsurge with a short stroke, which provides for faster opening; followed by oil-dampened reclosure. Optionally a cycle counter is integrated into the construction.

The surge relief valves are field adjustable, can install in any orientation, and have a body that can be made of lightweight ductile iron or other materials depending upon the objectives. The surge relief valves generally have a cylinder chamber integrated into the cover, including a ribbed-out lower portion of the cover to maintain rigidity while reducing weight, and a drilled vent hole is generally provided in the cover.

A piston moving through the self-contained hydraulic system provides a dampening force. The piston is mounted on a shaft, often a two-part shaft with upper and lower shafts. The upper and lower shafts can be constructed to have an equal diameter. The use of the self-contained hydraulic system allows for a design in which no oil make-up volume or external oil reservoir is required.

The compression spring pipe assembly providing a closing force generally has a modular design for optimal selection of components. The valve's compression springs are typically enclosed for safety. An anti-rotation screw indicates amount of spring compression, which allows for monitoring compression during setup of the valve. Thus, one, two or optionally more springs can be used to provide a counter force to the disc. The springs can nest together, desirably with an alternating coil direction to prevent interference between springs.

The above summary is not intended to describe each discussed embodiment of the surge relief valve. This is the purpose of the figures and the detailed description that follow.

FIGURES

The surge relief valve may be more completely understood in consideration of the following detailed description of various embodiments in connection with the accompanying drawings in which.

The valve will now be understood by review of the following detailed description.

DETAILED DESCRIPTION

In various fluid conduits, such as pipes carrying liquids, pressure surges occur when fluid velocity changes. Surge relief valves limit the magnitude of the surge pressure, such as that commonly associated with sudden pump shutdown in fluid piping systems, thereby avoiding fatigue in fluid pumping systems and avoiding mechanical breakdown in components and failure such as burst pipes or leaked seams.

The present disclosure is directed to surge relief valves and components for surge relief valves. The surge relief valves can be constructed so as to decrease the overall valve height to fit a variety of vaults and pump stations relative to existing valve constructions. The surge relief valve provides a force to control the pressure at which the valve opens, and includes dampening features that act to provide slow controlled reclosure. A self-contained hydraulic system is used instead of an external oil reservoir to control the valve opening and closing. Optionally a cycle counter is integrated into the construction.

The surge relief valves provide a direct response to pressure upsurge with a short stroke, which provides for faster opening; followed by oil-dampened reclosure.

The surge relief valves are field adjustable, can install in any orientation, and have a body that can be made of lightweight ductile iron or other materials depending upon the objectives. The surge relief valve generally has a cylinder chamber integrated into the cover, including a ribbed-out lower portion of the cover to maintain rigidity while reducing weight.

On top of the valve is a spring pipe assembly. The spring pipe assembly generally has a modular design for optimal selection of components. The compression springs are enclosed for safety. An anti-rotation screw indicates the amount of spring compression. A spring compression guide is hollowed out to reduce weight and allow for mechanical counter wire. Pre-compression of the springs reduces overall valve height; while a lock nut optionally secures the spring compressor. A shaft collar and thrust bearing take the reaction load.

One, two, or optionally more springs can be used to provide a counter force to the disc. The springs can nest together, desirably with an alternating coil direction to prevent interference between springs.

Figure 1:
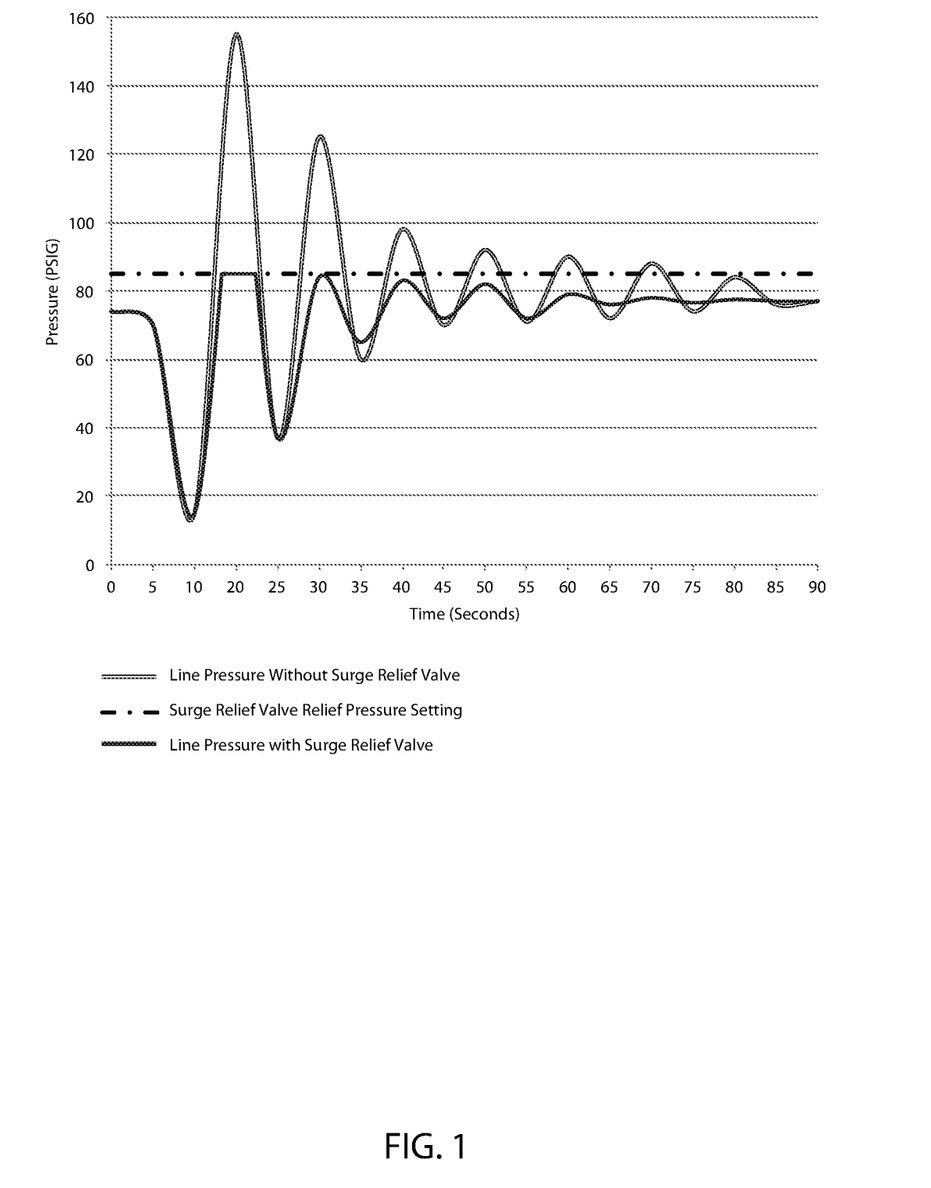
FIG. 1 is a chart showing line pressure of a system with and without a surge relief valve.

Referring now to FIG. 1, the surge relief valve is typically installed downstream of the check or pump control valves on the pump discharge header with the valve inlet connected to the side outlet of a tee and the valve outlet piped to the sump. The normally-closed surge relief valve opens quickly when the system pressure rises above its adjustable relief pressure setting allowing fluid to be discharged from the system through the open surge relief valve. While the surge relief valve is open, the system is no longer contained, fluid compression is limited, and surge pressure is controlled. The valve will remain open as long as the system pressure exceeds the valve's relief pressure setting. The valve will slowly begin to close at an adjustable rate as the surge pressure subsides and the system pressure falls below the valve's relief pressure setting.

Figure 2:
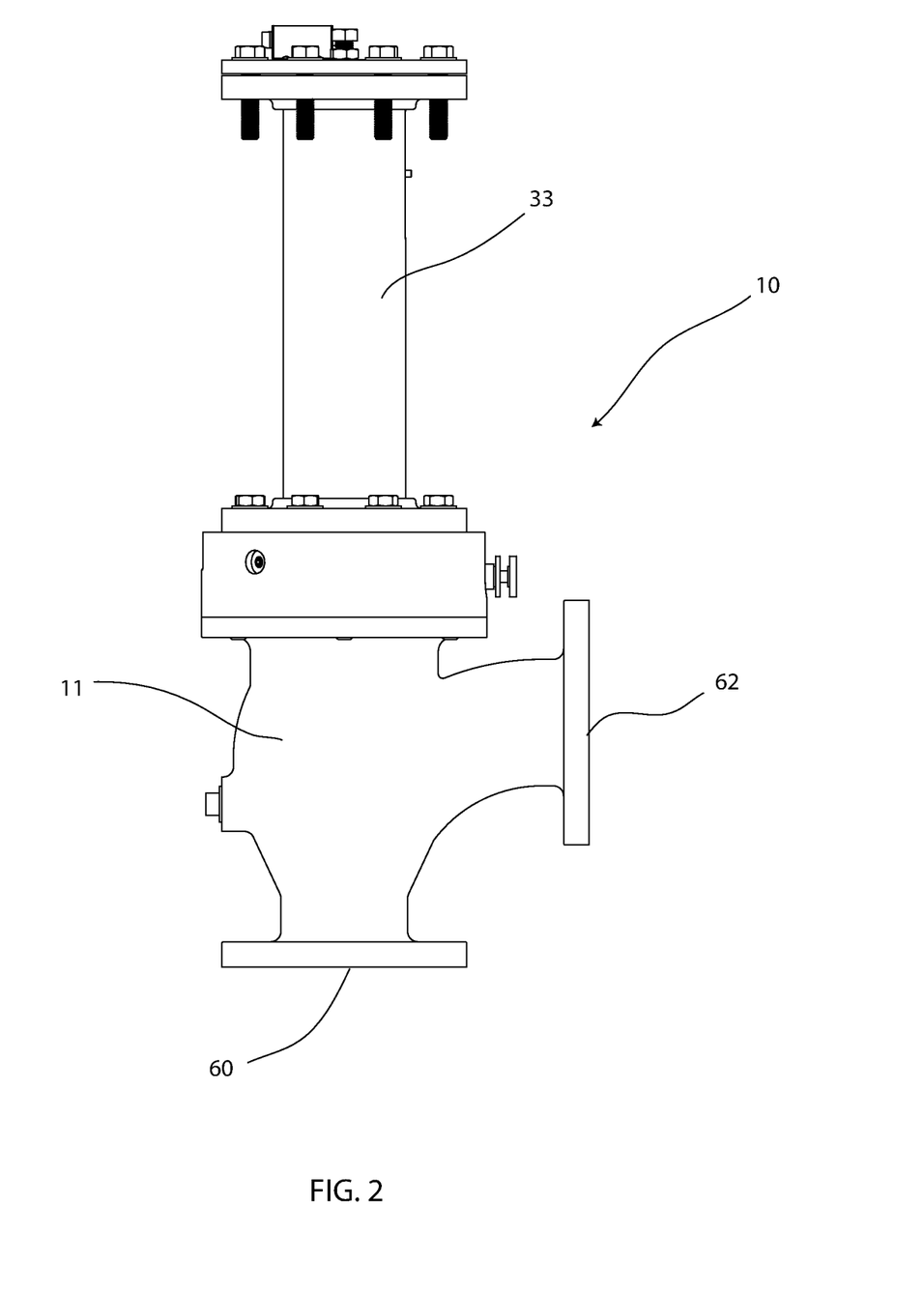
FIG. 2 is a side elevational view of an example surge relief valve.
Figure 3:
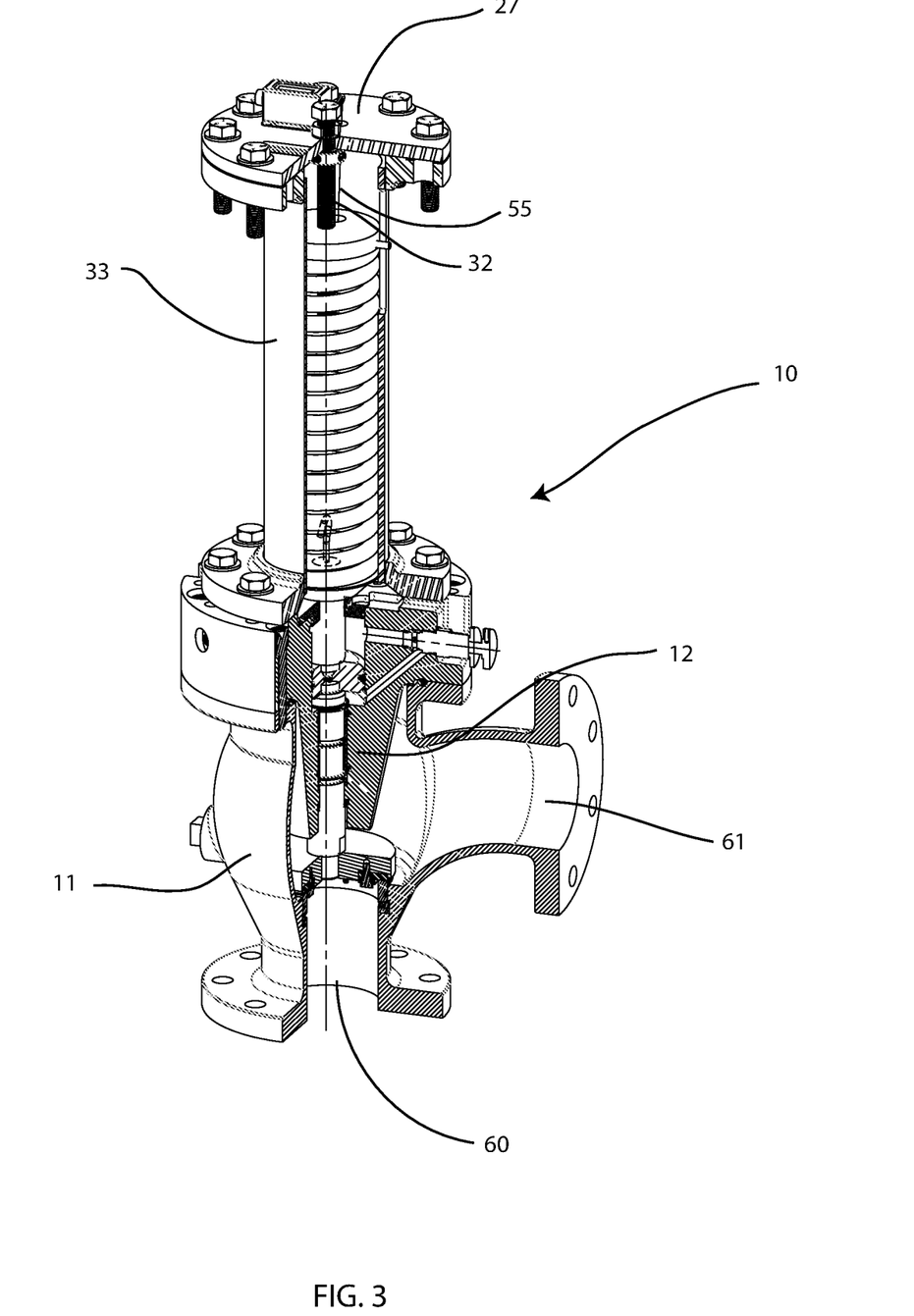
FIG. 3 is a perspective partial cross-section of an example surge relief valve.
Figure 4:
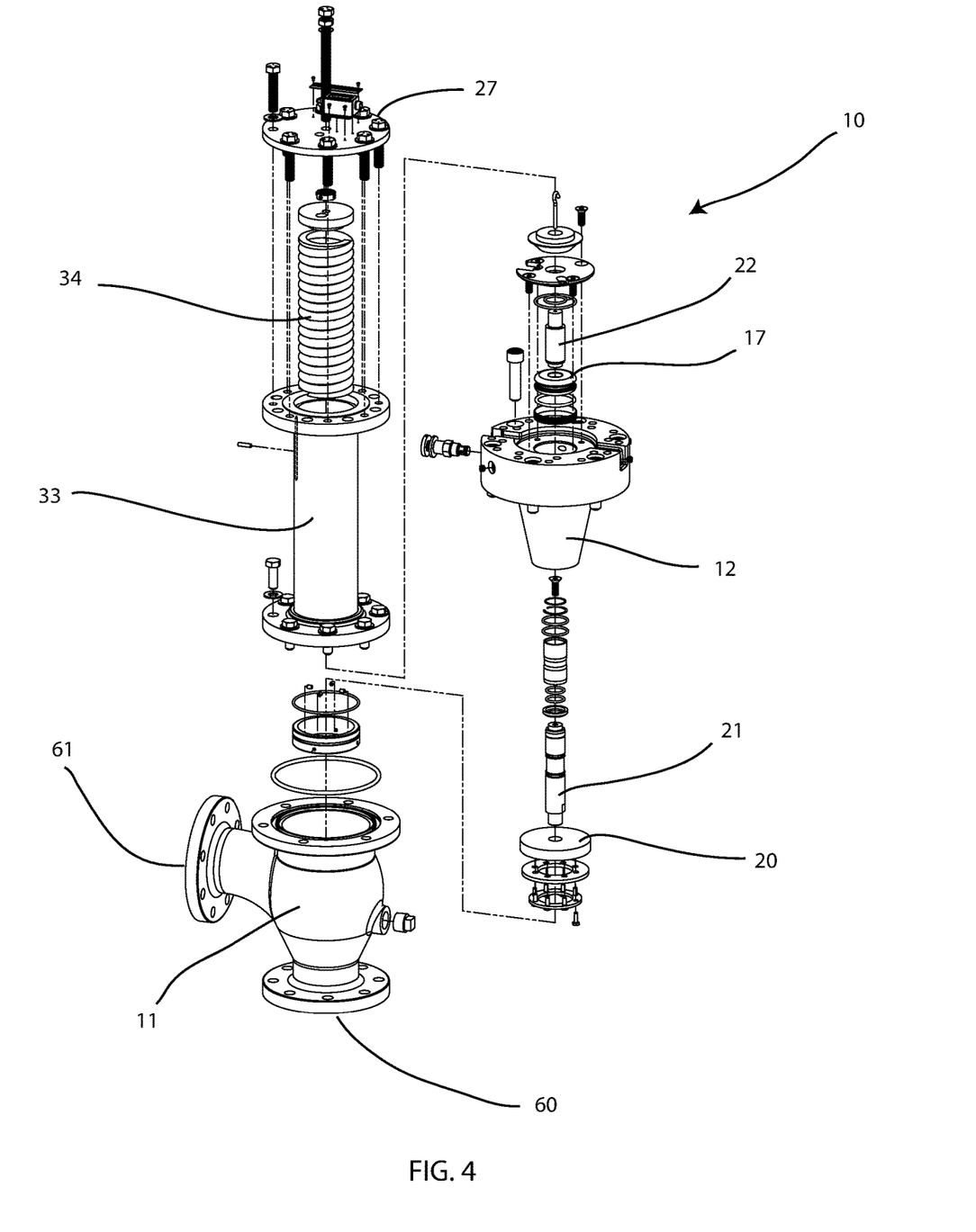
FIG. 4 is an exploded perspective view of an example surge relief valve.
Figure 5:
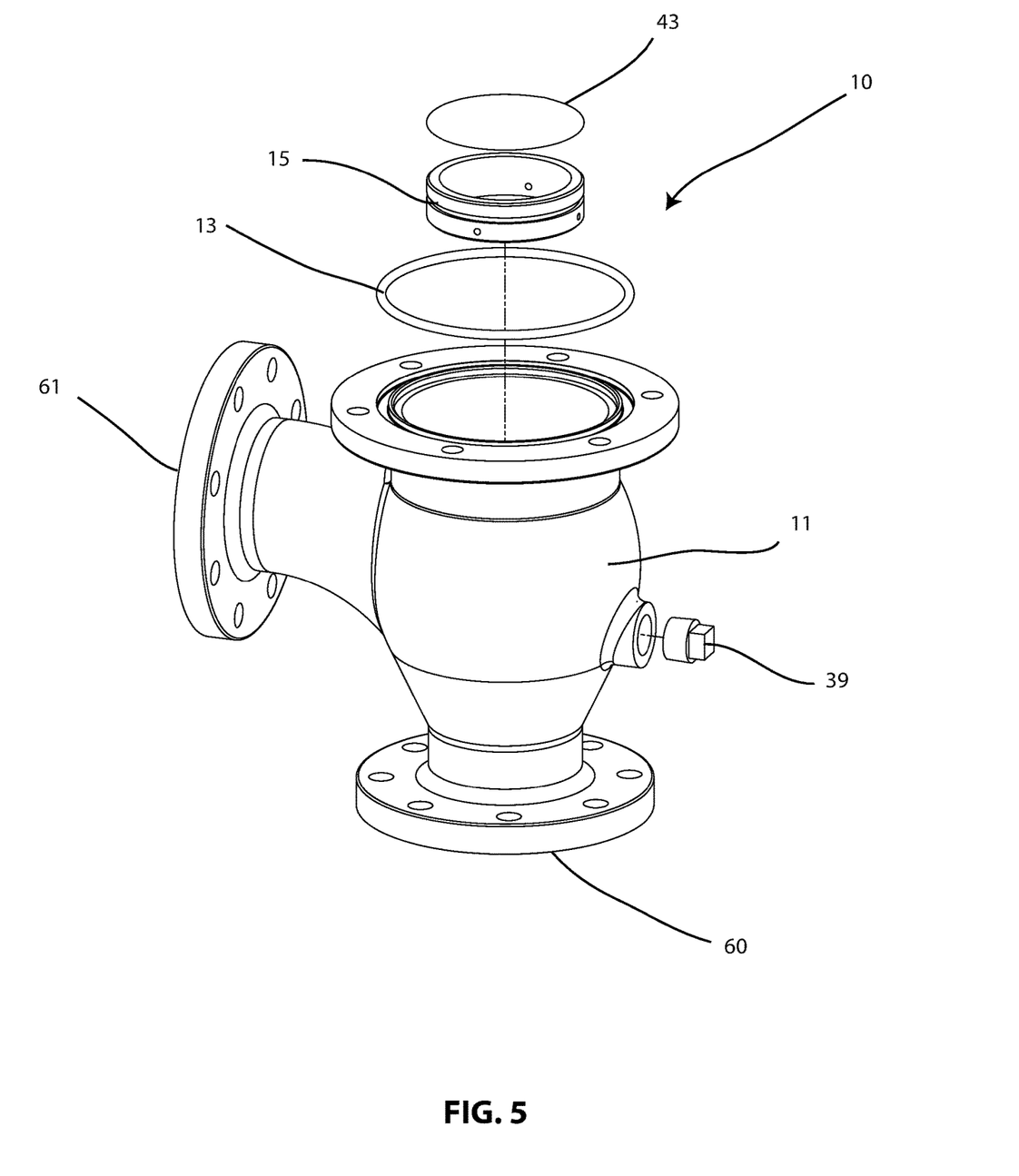
FIG. 5 is an exploded perspective view of the bottom portion of an example surge relief valve.
Figure 6:
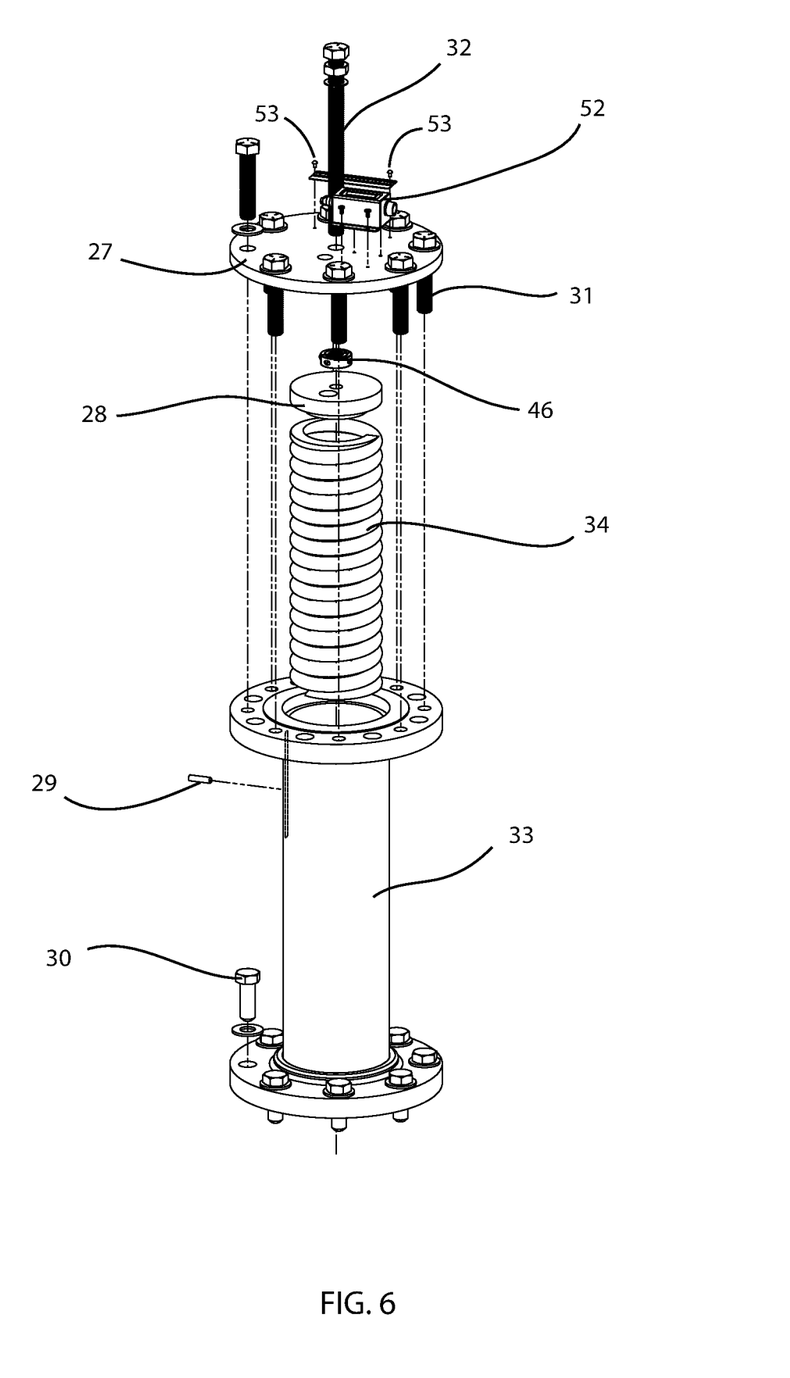
FIG. 6 is an exploded perspective view of the top portion of an example surge relief valve.
Figure 7:
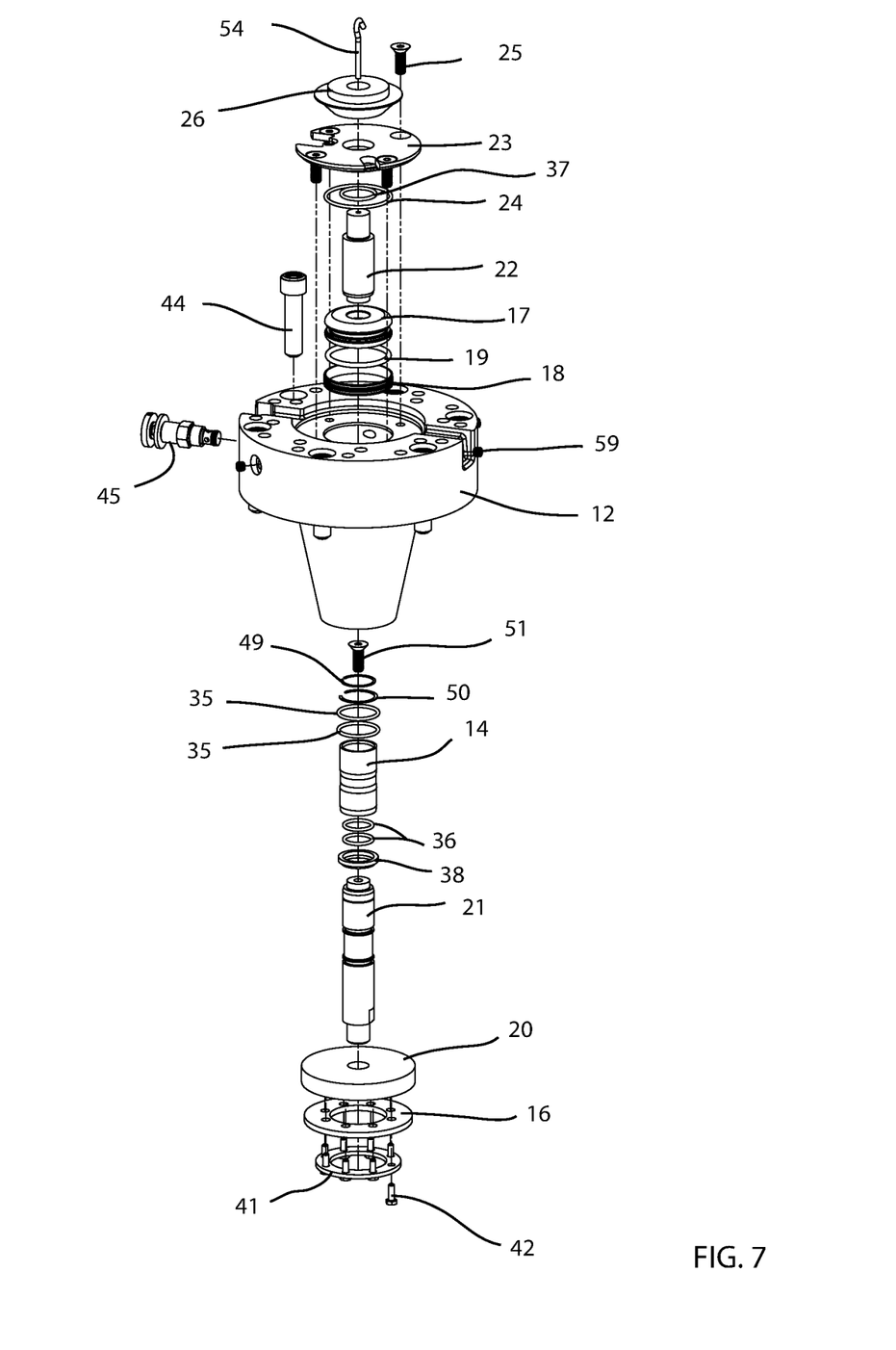
FIG. 7 is an exploded perspective view of middle components an example surge relief valve.

Referring now to the FIGS. 2 to 7, a surge relief angle valve 10 is shown. FIG. 2 is a side elevational view and FIG. 3 is a perspective partial cross-section of a surge relief valve. FIG. 4 is an exploded perspective view of a surge relief valve made in accordance with an implementation. FIG. 5 is an exploded perspective view of the bottom portion, FIG. 6 is an exploded perspective view of the top portion, and FIG. 7 is an exploded perspective view of the middle portion a surge relief valve made in accordance with an implementation.

The surge relief angle valve 10 is held normally-closed by compression spring(s) 34. When the system pressure rises above the relief pressure setting of the spring(s) 34, the disc 20 moves quickly to the open position, raising the piston 17 inside the integral oil cylinder of the cover 12. This causes hydraulic oil from the top of the piston to flow freely through the flow control valve 45 to the bottom of the piston 17. As the system pressure subsides below the relief pressure setting, the surge relief valve 10 closes at a slow adjustable rate. The spring(s) 34 moves the disc 20 toward a seated position as oil is metered from the bottom of the piston 17 to the top of the piston 17 by the adjustable flow control valve 45.

Closing speed of the surge relieve angle valve 10 can be adjusted and controlled. The flow control valve 45 causes free oil flow in the direction of opening and controlled flow in the direction of closing to allow fast open and slow close of the surge relief valve 10. Thus, closing speed can be adjusted to suit the system.

Pressure setting may also be adjusted and controlled. The relief pressure setting (valve opening pressure) is controlled by the amount of spring compression imposed by the spring compression guide 28 as set by the spring compressor 32. The relief pressure setting is generally factory-set but can be adjusted, within limits, by rotating the spring compressor 32. A lock nut is typically tightened to maintain the setting.

The surge relief valve 10 can have various configurations for field installation, but should generally be installed with the inlet 60 positioned such that the resilient seat 16 of the disc 20 faces the system pressure. The valve outlet 62 is generally be piped to the sump or into a spillway for discharge to atmosphere. The surge relief angle valves 10 may be installed vertically or horizontally. A mechanical cycle counter 52 can be used to log the number of surge events in the application.

Referring further into the specific drawings, the surge relief valve 10 can, in certain constructions, include a body 11, plus a cover 12. The body 11 and cover 12 are typically both formed of ductile iron. In an example embodiment, the ductile iron is selected from ASTM A536 grade 65-45-12, although other grades of iron and other materials can be used for the body 11 and cover 12.

A cover O-ring 13 is included, optionally made of acrylonitrile-butadiene (NBR); terpolymer of ethylene, propylene and a diene (EPDM); or fluoro rubber (FKM). The cover O-ring seals the cover 12 to the body 11 and prevents leaks from forming between the cover 12 and body 11.

A lower shaft bushing 14 is disclosed, along with a body seat 15. The lower shaft bushing 14 is optionally formed of bronze. The body seat 15 can be formed, for example, of aluminum bronze, such as alloy C95200 or stainless steel, such as 316 stainless steel according to ASTM A240.

A disc seat 16 provides a mating surface for the disc 20. The disc 20 and disc seat 16 combine to create a closure when the valve is not undergoing a surge. The disc seat can be formed of acrylonitrile-butadiene (NBR); terpolymer of ethylene, propylene and a diene (EPDM); fluoro rubber (FKM) or other material.

Piston 17 is formed, for example, of carbon steel, according to ASTM A108 grade 1018 or ASTM A36. Piston seal 18 can be formed, for example, of PTFE.

A further piston seal energizing O-ring 19 can be present, and formed of acrylonitrile-butadiene (NBR) or other material.

Disc 20 can be formed of: carbon steel according to ASTM A108 grade 1018 or ASTM A36; 316 stainless steel according to ASTM A240 or ASTM A276; or other material.

Lower shaft 21 can be formed, for example, of 303 stainless steel, ASTM A582, Condition A. Upper shaft 22 can be formed, for example, of 303 stainless steel, ASTM A582, Condition A. Cylinder chamber cap 23 can be formed, for example, of carbon steel, ASTM A108 grade 1018 or ASTM A36. The cylinder chamber cap includes an O-ring 24 optionally formed of acrylonitrile-butadiene (NBR).

Cylinder chamber cap screws 25 can be formed of alloy steel, and spring pressure plate guide 26 formed of carbon steel, ASTM A108 grade 1018 or ASTM A36.

Spring compression top flange 27 can be made of carbon steel, ASTM A108 grade 1018 or ASTM A36. Spring compression guide 28 can be, for example, formed of carbon steel, ASTM A108 grade 1018 or ASTM A36; or ductile iron, ASTM A536 grade 65-45-12. Anti-rotation set screw 29 is optionally 316 stainless steel.

Pipe assembly lower screws 30 and assembly upper screws 31 can be made, for example, of alloy steel, including zinc plated alloy steel.

A spring compressor 32 can, for example, be formed of alloy steel that is zinc plated. The spring compression pipe assembly 33 is desirably formed of steel. Compression spring 34 is formed, for example, of alloy steel, such as ASTM A125 grade. Bushing O-ring 35 can be formed of acrylonitrile-butadiene (NBR) or fluoro rubber (FKM). The lower shaft O-ring 36 is formed of acrylonitrile-butadiene (NBR) or fluoro rubber (FKM) in some embodiments. The upper shaft O-ring 37 can be formed of acrylonitrile-butadiene rubber (NBR).

A rod wiper 38 is formed of polyethylene or other polymers.

An inspection hole pipe plug 39 can be constructed of stainless steel, as can body seat retaining screws 40. A disc seat retaining spring 41 can be formed of stainless steel. Disc seat retaining screws 42 can be made, for example, of 316 stainless steel.

Body seat O-ring 43 is generally a polymer, such as acrylonitrile-butadiene (NBR), terpolymer of ethylene, propylene and a diene (EPDM); or fluoro rubber (FKM).

Cover screws 44, flow control valve 45, and shaft collar 46 can all be formed of steel or various steel alloys. Optionally, a needle thrust bearing 47 can be formed of steel, a lock nut can be formed of zinc plated steel, a lower shaft retaining ring 49 can be formed of steel, and a bushing retaining ring 50 can also be formed of steel. Piston assembly screw 51 can be made of steel, such as alloy steel, and the mechanical counter 52 made of steel with plastic.

The mechanical counter mounting screws 53 can be formed, for example, of 18-8 stainless steel. Mechanical counter hook 54 includes a lock nut, and can be formed of carbon steel that is zinc plated. The mechanical counter wire 55 can also be formed of stainless steel, such as 302 stainless steel. The pipe assembly lower screw washers 56 and the pipe assembly upper screw washers 57 can be formed of carbon steel that is zinc plated. The spring compressor washer 58 is formed, for example, of carbon steel that is zinc plated.

Pre-compression of the springs can be used to reduce overall valve height. The springs may undergo "pre-compression" during the initial portion of assembly at the factory, where the extra-long pipe assembly upper screws 31 are tightened to draw down the spring compression top flange 27 and thereby compress the spring(s) 34 from the free length to the minimum compression distance for a usable surge relief setting. This establishes the overall height of the installed valve at the least amount possible. Second, the spring(s) can be compressed during the adjustment at the factory or in the field with the spring compressor. This adjusts the pressure relief setting from its minimum value (such as 30 psi) to whatever relief pressure is required for the specific application. Third, the spring(s) compresses when a surge occurs, whereupon the pressure rises and causes the valve to open. The FIGS show oil fill pipe plugs 59, optionally formed of steel.

The present invention should not be considered limited to the particular examples described above but rather should be understood to cover all aspects as fairly set out in the attached claims. Various modifications equivalent processes as well as numerous structures to which the present invention may be applicable will be readily apparent to those of skill in the art to which the present invention is directed upon review of the instant specification.

I claim:

1. A surge relief valve, the surge relief valve comprising:
   a body containing a fluid flow pathway through the body, a disc, and disc seat configured to control flow through the pathway, wherein the disc and the disc seat are aligned coaxially with an inlet of the valve, and wherein the disc comprises a lower face configured to mate with the disc seat, wherein the lower face of the disc faces the fluid flow pathway;
   a piston and shaft, the piston and shaft in communication with the disc and disc seat; and
   a spring providing a force against the piston;
   wherein the spring is enclosed within a housing;
   wherein the surge relief valve has a closed self-contained hydraulic system containing the piston and shaft, the self-contained hydraulic system containing hydraulic oil within which the piston and shaft are positioned, and providing a dampening force against the spring force;
   wherein the disc is held in a closed position by the spring and the disc moves to an open position when a system pressure rises above a relief pressure setting of the spring; and
   wherein the self-contained hydraulic system is positioned outside of the fluid flow pathway and is isolated from fluids flowing through the fluid pathway.

2. The surge relief valve of claim 1, wherein the surge relief valve comprises at least two springs providing a force against the piston.

3. The surge relief valve of claim 1, wherein the surge relief valve comprises at least two springs providing a force against the piston.

4. The surge relief valve of claim 1, wherein the height of the surge relief valve is less than 5 times the diameter of a conduit on which it is configured to be installed.

5. The surge relief valve of claim 1, further comprising a mechanical cycle counter.

6. The surge relief valve of claim 1, wherein the surge relief valve has a closed self-contained hydraulic system and no external oil reservoir.

7. The surge relief valve of claim 1, wherein the surge relief valve has a cylinder chamber integrated into a cover.

8. The surge relief valve of claim 1, wherein the piston is mounted on a shaft.

9. The surge relief valve of claim 1, wherein the piston is mounted on a two part shaft with separable upper and lower shafts.

10. The surge relief valve of claim 1, wherein the piston is mounted on a two-part shaft with upper and lower shafts of equal diameter.

11. The surge relief valve of claim 1, further comprising an anti-rotation screw that indicates the amount of spring compression.

12. The surge relief valve of claim 1, further comprising a hollow spring compression guide containing a mechanical counter wire.

13. The surge relief valve of claim 1, wherein fluid can flow freely between the disc and the disc seat when the disc is in the open position.

14. The surge relief valve of claim 1, the self-contained hydraulic system further comprising a flow control valve, wherein as the disc moves from the closed position to the open position, the hydraulic oil flows freely through the flow control valve from the top of the piston to the bottom of the piston.

15. The surge relief valve of claim 14, wherein as the disc moves from the open position to the closed position, the hydraulic oil is metered from the bottom of the piston to the top of the piston through the flow control valve at an adjustable rate, wherein the rate is determined by a setting of the flow control valve.

16. A surge relief valve, the surge relief valve comprising:
   a body containing a fluid flow pathway through the body, a disc and disc seat configured to control flow through the pathway wherein the disc and the disc seat are aligned coaxially with an inlet of the valve, and wherein the disc comprises a lower face configured to mate with the disc seat, wherein the lower face of the disc faces the fluid flow pathway;
   a piston and shaft, the piston and shaft in communication with the disc and disc seat; and
   at least two springs providing a force against the piston;
   wherein the springs are enclosed within a housing and
   wherein the surge relief valve has a closed self-contained hydraulic system containing the piston and shaft, and providing a dampening force against the spring force, the self-contained hydraulic system positioned outside of the fluid flow pathway and is isolated from fluids flowing through the fluid pathway;
   wherein the surge relief valve has a cylinder chamber integrated into the cover; the cylindrical chamber containing hydraulic oil into which the piston is submerged and;
   wherein the disc is held in a closed position by the spring and the disc moves to an open position when a system pressure rises above a relief pressure setting of the spring.

* * * * *